(12) United States Patent
Schumann et al.

(10) Patent No.: US 7,730,313 B2
(45) Date of Patent: Jun. 1, 2010

(54) TRACING CONTENT USAGE

(75) Inventors: Robert Schumann, Oakton, VA (US); Jeffrey Segal, Midlothian, VA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 1181 days.

(21) Appl. No.: 11/193,616

(22) Filed: Aug. 1, 2005

(65) Prior Publication Data

US 2006/0075244 A1  Apr. 6, 2006

Related U.S. Application Data

(60) Provisional application No. 60/592,119, filed on Jul. 30, 2004, provisional application No. 60/676,965, filed on May 3, 2005, provisional application No. 60/700,735, filed on Jul. 20, 2005.

(51) Int. Cl.
*H04L 9/32* (2006.01)
*G06F 21/00* (2006.01)
*H04N 7/16* (2006.01)

(52) U.S. Cl. .......... 713/176; 713/189; 726/32; 725/25; 705/52

(58) Field of Classification Search .......... 713/176, 713/189; 726/32; 725/25; 705/52
See application file for complete search history.

(56) References Cited

U.S. PATENT DOCUMENTS 6,285,774 B1 * 9/2001 Schumann et al. .......... 382/100

OTHER PUBLICATIONS

Christopher, Lauren Ann et al. WIPO Publication WO/1998/033105, published Jul. 30, 1998.*

\* cited by examiner

*Primary Examiner*—Michael J Simitoski

(57) ABSTRACT

Disclosed is a system configured to process content to enable tracing of at least one of a multitude of subsequent uses of content by at least one user. The system provides for: making markable content from content, iteratively marking the markable content with information such as use information; and later extracting at least one of the iteratively applied marks.

8 Claims, 10 Drawing Sheets

TRACING CONTENT USAGE

CROSS-REFERENCES TO RELATED APPLICATIONS

This application claims the benefit of: U.S. Provisional Application No. 60/592,119, filed Jul. 30, 2004, entitled "Tracing Content Usage"; U.S. Provisional Application No. 60/676,965, filed May 3, 2005, entitled "Common Carrier Watermark"; and U.S. Provisional Application No. 60/700,735, filed Jul. 20, 2005, entitled "Common Carrier Watermark"; which are incorporated by reference herein.

BACKGROUND OF THE INVENTION

The present invention relates to the field of copyright enforcement tools. More specifically, the present invention provides a mechanism for tracing usage of content.

Large amounts of copyrighted content are currently available in digital form. Such content includes movies, audio, and data files. There is great concern over the loss of control of this content. The cost of producing program material, such as entertainment movies, is considerable, whereas, the cost to the copyist is relatively low. Hence, movie piracy has become a substantial source of loss of revenue for the movie industry. Indeed, more than 3 billion dollars are lost to copyists annually, mainly in the form of bootleg video cassettes, peer-to-peer sharing of content and DVD discs.

Distribution of content subject to agreements regulating use is common. When these agreements are broken, content owners and distributors may loose money due to uncollected royalties and outright piracy. Content distribution and presentation industries have had a hard time providing an effective system for enforcing content use agreements after the content has been distributed. Enforcement has largely been done by hand audits of content presenters at great expense to both distributors and presenters.

Two approaches to thwarting piracy have been implemented by legitimate producers of movies and other types of material having commercial value, such as software: (1) injecting, into a protected medium, a signal that distorts the material in some manner when played, and (2) watermarking, by injecting a visible or invisible static symbol or mark that identifies the source of the original material.

Watermarking commonly is performed on a medium at the point of authoring of protected material. An example is at a post house or other facility at which the information-bearing medium is produced. However, once recorded, the watermark is fixed. Although the watermark may identify the source of authoring of the material, it will provide no information on the identity of an unauthorized copyist. It would be useful if the identity of the copyist was obtained from information gathered at the point of playback and copying. This may include such information as identification of the equipment used by the copyist and time of copying. Circuitry to provide this information at the playback unit, however, will increase the cost of the unit, a considerable disadvantage in this competitive industry. An objective of this invention is to produce a tracing signal at multiple points of use, that varies in dependence of, and is unique to, the copyist of a protected medium. Another objective is to do so without adding significant cost to the playback unit.

The protective signal furthermore should preferably be capable of being unpredictable, as predictability will enable a copyist either to filter out the signal, or alter it so as to provide a false designation of source. The protective system should also be robust, as any source of copying message injected into the signal stream should be recoverable in an environment having heavy transmission noise, and unintentional or intentional distortion. Furthermore, the sending message should be difficult to detect, modify or remove. The message content should be protected and difficult to decode, even if the transmitted bits identifying source are available.

Finally, the output stream must be legal to enable proper decoding in the appropriate domain. An additional objective of this invention is to produce use information, injected into the signal stream that is difficult for a copyist to detect or alter. The use information furthermore should preferably be able to be injected into any type of protected content, including audio and software, in addition to video.

U.S. Pat. No. 6,285,774 to Schumann et al. (herein after referred to as the '774 patent) and entitled "System and methodology for tracing to a source of unauthorized copying of prerecorded proprietary material, such as movies" discloses a system which addresses this issue. This patent enables the source of an unauthorized copy of an information-bearing medium, such as a video DVD, to be traced. As disclosed in the patent, the content stored on the medium is altered to include "running marks." Running marks comprise holes in the content that may be encoded with a message designating where and when a single copy of the content was made. This patent is hereby included by reference for its' teaching of running marks. Typically, the message is spread throughout the content.

One problem with the '774 patent is that it does not address the situation where content is used multiple times, possibly on different pieces of equipment, possibly at different locations. For example, in the movie industry, content typically changes hands several times through daily shootings, the pre-release production process, mastering, replication, initial distribution, post distribution traffic. To solve this problem, a system that can allow a content owner to track multiple subsequent uses of content is needed.

BRIEF SUMMARY OF THE INVENTION

One advantage of the invention is it provides a method for tracking usage of content.

Another advantage of the invention is that it allows for information describing multiple uses of content to be embedded in the content.

Another advantage of the invention is that it allows for hiding of use information of previous users from subsequent users.

Another advantage of the invention is that it allows for the extraction of use information from marked content.

To achieve the foregoing and other advantages, in accordance with all of the invention as embodied and broadly described herein, a system capable of processing content to enable tracing of at least one of a multitude of subsequent uses of the content by at least one user is disclosed. The system provides for: making "markable content" from the content, iteratively marking the markable content with information such as use information; and later extracting at least one of the iteratively applied marks. The content may be made markable by preselecting at least one location in the content capable of storing use information and generating at least one alteration. the content may be marked by providing a current user with the markable content, at least one location, at least one of said at least one alteration, and inserting use information into the markable content by selectively modifying at least one location using at least one alteration.

In yet a further aspect of the invention, the use information includes at least one of the following: a recording medium identification, a use device identification; content reproduction information; contract information; time of use information; and a content source identification.

In yet a further aspect of the invention, the marked content is analyzed to determine the use information.

In yet a further aspect of the invention, a system for processing content to enable tracing of at least one of a multitude of subsequent uses of the content by at least one user, comprising: a markable content generator capable of creating markable content from the content, and at least one content marker capable of creating marked content by inserting use information into the markable content during at least one subsequent use by selectively modifying at least one location using at least one alteration. The markable content generator including: a location selector capable of selecting at least one location in the content capable of storing use information; and an alteration generator capable of generating at least one alteration for at least one of the locations.

In yet a further aspect of the invention, a use information extractor capable of extracting use information from the marked content by comparing the content with the marked content.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated in and form a part of the specification, illustrate an embodiment of the present invention and, together with the description, serve to explain the principles of the invention.

Reference Numerals in Drawings, wherein elements having the same reference numeral designations represent like elements throughout, and wherein.

Figure 1:
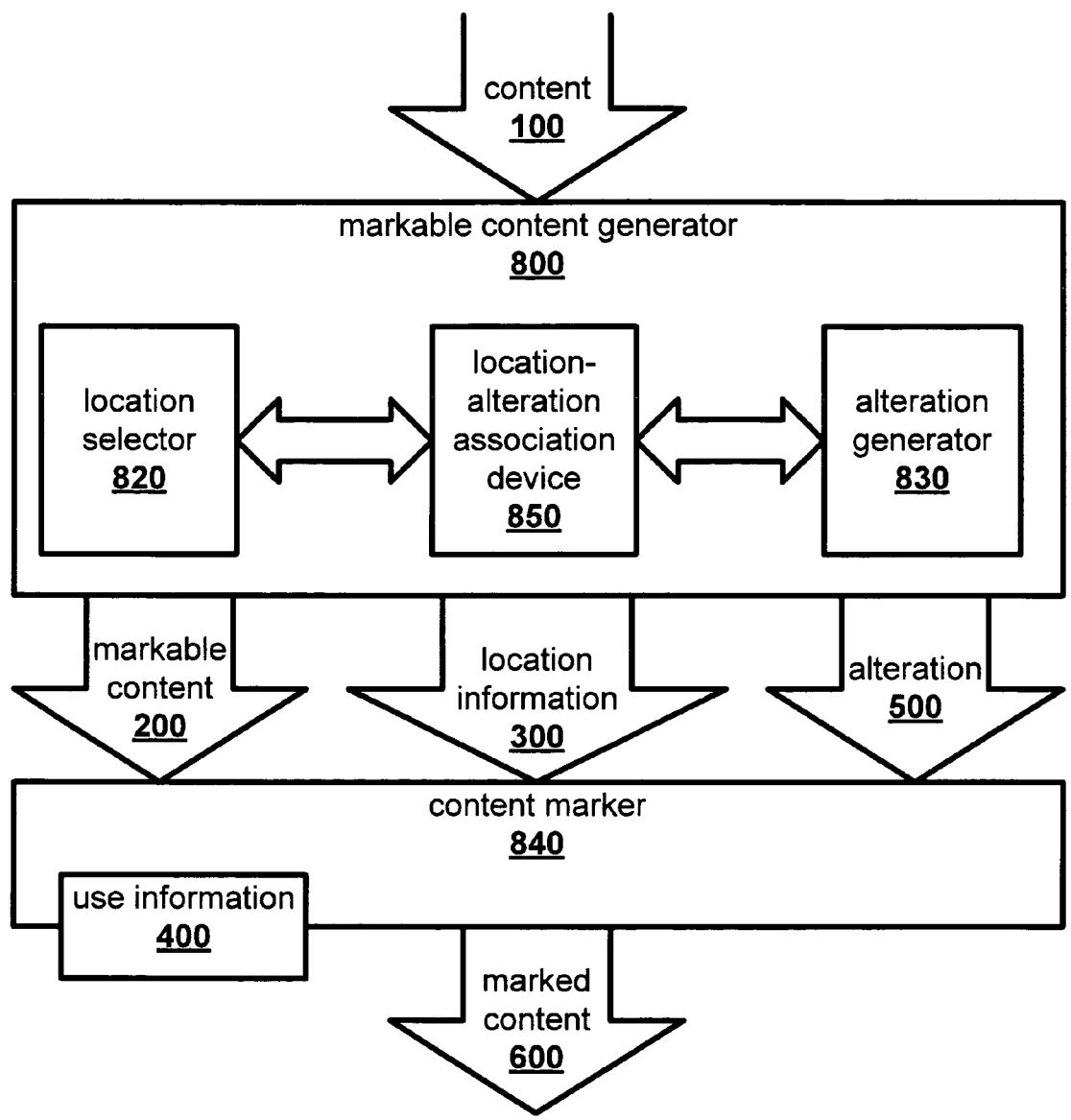
FIG. 1 is a block diagram of a content use tracker as per an aspect of an embodiment of the present invention.

100 content
200 markable content
300 location information
400 use information
500 alteration information
600 marked content
800 a markable content generator
820 a location selector
830 an alteration generator
840 at least one content marker
850 a location-alteration association device
900 a location extracted
910 a use information extractor
920 a use information eraser
S1000 receive content
S1010 make content markable
S1012 preselect location(s)
S1014 prepare area around preselected location(s)
S1016 generate alteration(s)
S1018 associate location(s) and alteration(s)
S1020 mark content with use information
S1022 receive markable content
S1024 receive location information
S1026 receive alteration information
S1028 insert use information
S1030 extract use information from marked content
S1032 receive content
S1034 receive marked content
S1036 receive location information
S1038 conform marked content to content
S1040 content at location(s) the same?
S1042 extract information from the marked content
1100 dedicated DVD player
1110 disc drive
1120 disc drive interface
1130 drive controller
1140 drive controller interface
1150 decoder
1160 security controller interface
1200 component disc drive
1210 disc drive
1220 disc drive interface
1230 drive controller
1240 ATA interface
1250 CPU
1260 security controller interface

DETAILED DESCRIPTION OF THE INVENTION

The present invention includes a system for processing content 100 to enable tracing of at least one of a multitude of subsequent uses of the content 100 by at least one user 120. The processing provides for the addition of virtually invisible marks into the content multiple times. Each of the multiple marks may be applied by different equipment, different users, at different times. Each of these marks may include use information 400.

A preferred embodiment of the invention is described within the context of a video stream produced in an MPEG domain, although it is to be understood that the invention is not limited thereto. For example, use information 400 may be combined into an audio signal or into software using similar principles. These marks may be invisible to a viewer, but detectable and decodable by an authorized system. As will be described, the message may include information such as the identity of content users, hardware involved in the use of content, and the time of content use. Significantly, this message may be uniquely produced each time the content is used by compliant equipment. By analyzing marked content (that may have been pirated from an authorized copy), and decoding the message embedded in the marks added to the video stream, a content owner may begin to trace the uses of the content. In the present invention, the term "use" is intended to mean events where content is utilized in such a way that they may warrant the addition of a forensic trail. Examples of such events may include playing content, handling content, distribution of content, bundling of content, processing of content, editing of content, viewing of content, copying of content, and storing of content.

Because new marks may be inserted into the content incrementally each time the content is subsequently used, the marks are termed "incremental running marks." Incremental running marks differ from watermarks that do not change once created at the point of authoring. Further, incremental running marks in the present invention differ from running marks (such as those disclosed in the '774 patent) because the present invention provides specifically for a multitude of marks to be added to content.

FIG. 1 is an illustrative example of the system. As shown, markable content 200 may be created from the content 100 by a markable content generator 800. The earlier referenced '477 patent describes mechanisms to mark content. Content marker(s) 840 may then, subsequently and separately, create marked content 600 by marking the markable content 200.

Content may be any type of electronic content. In the present best embodiment, this content is digital audio-visual content such as digital movies. However, one skilled in the art will recognize that content may be any type of content such as video, audio, or data; in both analog or digital formats.

The content may include compressed content, however, the present invention may also be used with uncompressed content. Further, the content may be encoded content, however, the present invention may also be used with unencoded content. Encoded content may be encoded using any number of encoding schemes such as: MPEG, MPEG-1, MPEG-2, MPEG-4, MPEG-6, JPEG, JPEG-2000, motion JPEG, H.263; VC-9, Dolby AES, DTS, MPEG Audio, and wavelet compression. In a best mode embodiment, the content includes MPEG encoded data encoded according to an MPEG standard. However, one skilled in the art will recognize that other types of electronic content may also be processed by this invention. For example, it may be possible that content may include audio content, still image content, or other type of data.

Markable content 200 may be marked content 600. The term markable content 200 may be defined as any content 100 that has been processed (such as by a markable content generator 800) so that marks such as use information 400 may later be embedded in the markable content 200. Markable content 200 may also be premarked with data. When it is still possible to insert use information 400 into marked content 600, then that marked content 600 may also be markable content 200.

Figure 3:
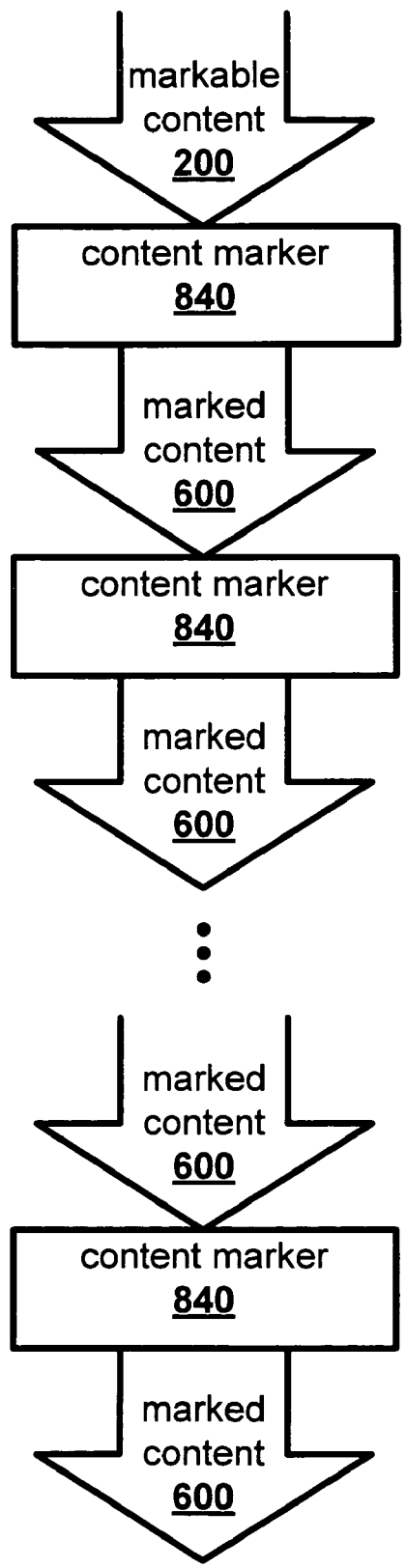
FIG. 3 is a block diagram of a multitude of content markers processing content in succession as per an aspect of an embodiment of the present invention.

An example of where marked content 600 is also markable content 200 is shown in FIG. 3. FIG. 3 is a block diagram of a multitude of content markers processing content in succession. It is a feature of the present invention, that content be markable in succession. For example, movie content could be marked when it is initially distributed, then marked again when it is subsequently used. Among other things, this provides for the history of content usage to be recorded in the marked content. In this illustrated embodiment, it may also be useful for at least one content marker 840 to be capable of receiving location information 300 from a separate content marker 840. Similarly, it may also be useful for at least one content marker 840 to be capable of receiving alteration information 500 from a separate content marker 840.

Pruning location information 300 may be achieved when a content marker 840 from a prior user does not pass all of the location information 300 to a successive content marker 840. When this occurs, the receiving content marker 840 would not know of the existence of the missing location(s) and therefore would not know to use them. Doing this could provide an extra level of assurance that a successive user would not modify the use information 400 or other marks placed into the marked content 600 by a prior user. It may additionally be useful to also prune related alteration information 600 when pruning location information 300. When location information 300 is not pruned, it should be possible for a subsequent content marker 840 to remark content using previously used locations. Remarking will preferably be done according to rules that maximize the availability of locations. One such rule may be that content not be remarked until all available locations have been used.

The markable content generator 800 processes content 100 so that use information 400 may later be inserted into it by selectively modifying at least one location 300 using at least one alteration 500. The markable content generator 800 may include a location selector 820 and an alteration generator 830. The location selector 820 is preferably capable of selecting at least one location 300 in the content 100 capable of storing the use information 400. The alteration generator 830 should be capable of generating alteration(s) 500 that when inserted into a location 300 will be minimally perceptible by a person, but will be detectable by a use information extractor 910 (see FIG. 4).

A location 300 is a place within content 100 that may subsequently be used in holding all or part of a mark in the content 100. A location 300 may also include a predetermined area within the content 100. Predetermined area may vary depending upon the type of content. Examples of a predetermined area may include a spatial component within a video frame, a temporal component within a video frame, a frequency band within signal data, or a temporal and frequency component of an audio signal. Basically, a predetermined area may include any identifiable and processable part of content 100.

When a predetermined area is a frequency component of an audio signal, than all frequencies between a specific range (such as 500 to 600 Hz) may be used in the marking process. For example, to create a mark in the audio, the 500 to 600 Hz signals could be inaudibly altered such that the alterations are detectable when compared with the original signal. In this case, alterations could include frequency swapping, frequency shifting, frequency attenuation, or frequency amplification.

A predetermined area might also be an image attribute. The image attribute might be associated with a video frame. Locations may be located in the frame either manually by an operator, or automatically by machine based upon prescribed image attribute criteria, so as not to be visible to a viewer. Transitions or textured regions, such as the boundaries of the image or a frame may also be good location selections. The predetermined area of a subsequent frames for modification may differ. This may be of particular benefit when the alterations are chosen based on frame attributes that are likely to change with frame content. When the content 100 comprises MPEG video, at least one of the predetermined areas may comprises blocks such as pixel blocks or macro blocks.

Preselected locations may also be preconditioned to increase the marking quality of the location. Preconditioning may include replacing or otherwise modifying data that surrounds the selected location. Another way to precondition a location may be to process an area adjacent the location 300. These steps may help in later hiding an alteration mark from being perceived.

It may also be important that location(s) 300 are non-regularly occurring. Irregular spacing may help prevent later detection of inserted marks by unauthorized parties.

Alteration(s) 500 may include compressed alterations or uncompressed alterations. Alterations may be predetermined. Similarly, alteration(s) 500 may be encoded, scrambled, or encrypted. Some methods where the alterations are in the compressed space are described in the '774 patent.

Alterations may also be described as an alteration method 520. In this case, the alteration may be a predetermined algorithm or set of algorithms that be used to process the content 100 in such a way as to embed the use information 400 into the content 100.

Basically, it is envisioned that the alterations will be adapted to fit the format of the content. For example, when the content includes images, alteration(s) 500 may be an altered image 530. When the content is MPEG content, alteration(s) 500 may include replacement B-frame(s) in an MPEG data stream. Additionally, the '774 patent describes other ways for alterations to be adapted to content.

The described embodiment further includes a location-alteration association device 850. This location-alteration association device 850 preferably associates location(s) 300 with alteration(s) 500. Alteration(s) 500 may be customized to a location. For example, content 100 may be processed, and alterations 500 chosen or created based on perceptibility and detectability constraints. For any location in the content 100, some alterations 500 may be more optimal to use then others. In some cases, the alterations 500 may be created so that it will only work at a certain location. For this reason, it may be desired for some embodiments to have a location-alteration association device 850 so that specific alteration(s) 500 will be associated for use with other specific location(s) 300.

Figure 2:
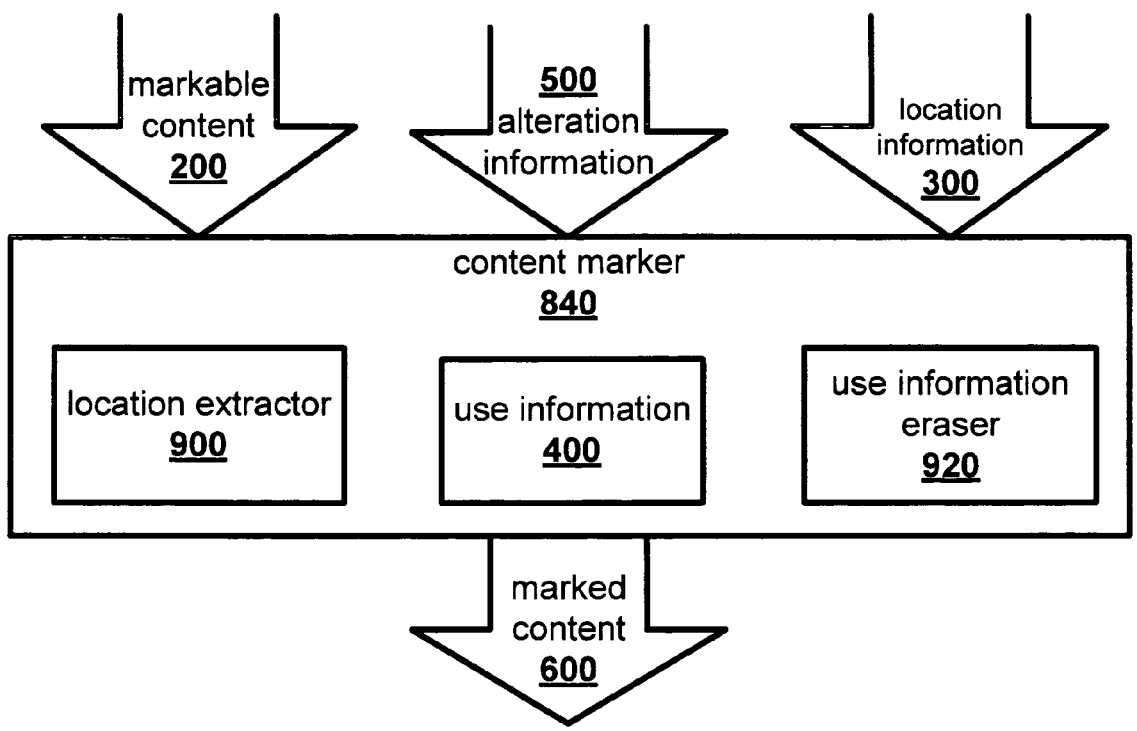
FIG. 2 is a block diagram of a content marker as per an aspect of an embodiment of the present invention.

Markable content 200, location information 300 and alteration information 500 may then be passed from the markable content generator 800 to content marker(s) 840. FIG. 2 shows a content marker 840 as per an aspect of an embodiment of the present invention. The markable content marker 840 should be capable of inserting use information 400 into markable content 200 by selectively modifying at least one location 300 using at least one alteration 500.

There are many ways that marking information such as location information 300, alteration information 500 and markable content may be delivered to a content marker 840. For example, one or more alterations 500 may be delivered to a content marker used by a current user separately from the markable content 200. Alternatively, one or more alterations 500 may be delivered to a content marker used by a current user with the markable content 200. Similarly, location information 300 may be delivered to a content marker used by a current user either with or separately from the markable content 200. The method of delivery may be chosen based on constraints such as security, system design, and logistics.

Use information 400 preferably includes at least one type of information which can be used to identify content usage. Examples of use information 400 describing the content include: recording medium identification; use device identification; content reproduction information; contract information; time of use information; and content source identification.

Additional security measures may be taken to protect the use information 300 prior to being inserted into the markable content 200. For example, the use information 400 may be scrambling, encrypted, encoded. Encoding may include processing the use information 400 using spread spectrum carrier.

Additional steps may also be taken to increase the probability of recovering the use information 400 successfully. Such steps may include repeating the use information 400 multiple times in the markable content 200. Another step may include adding error correction bits to the use information 400.

A content marker 840 may also include a location extractor 900. A location extractor 900 is preferably capable of preventing at least one content marker 840 from passing on at least one location 300 either with or as part of the outputted marked content 600. An advantage of this location extractor 900 is that it may hide location information 300 that has been used. This may effectively remove these locations from use by other content marker(s) 840 that may subsequently process the content. Further, this may also remove these locations from unauthorized users who may wish to modify alterations residing at the used locations. Since related alteration information 500 could be extraneous without location information 300, a preferred embodiment would also extract otherwise unused but related alteration information 500.

A use information eraser 920 may also be included in a content marker 840. A use information eraser 920 will preferably be capable of removing use information 400 from said marked content 600. One advantage of the use information eraser 920 is that it may free up locations in content for future marking. When all available locations are used, the system may use an algorithm to decide when to erase use information 400 so that those locations may be used again for embedding new use information 400. There may also be other reasons to erase use information 400 embedded in the content. For example, some use information 400 may only be important for a fixed number of uses, or until a particular use information extractor 910 has had a chance to evaluate the content. Additionally, a use information eraser 920 can assist in preventing some use information 400 from being recovered at a later time.

Figure 4:
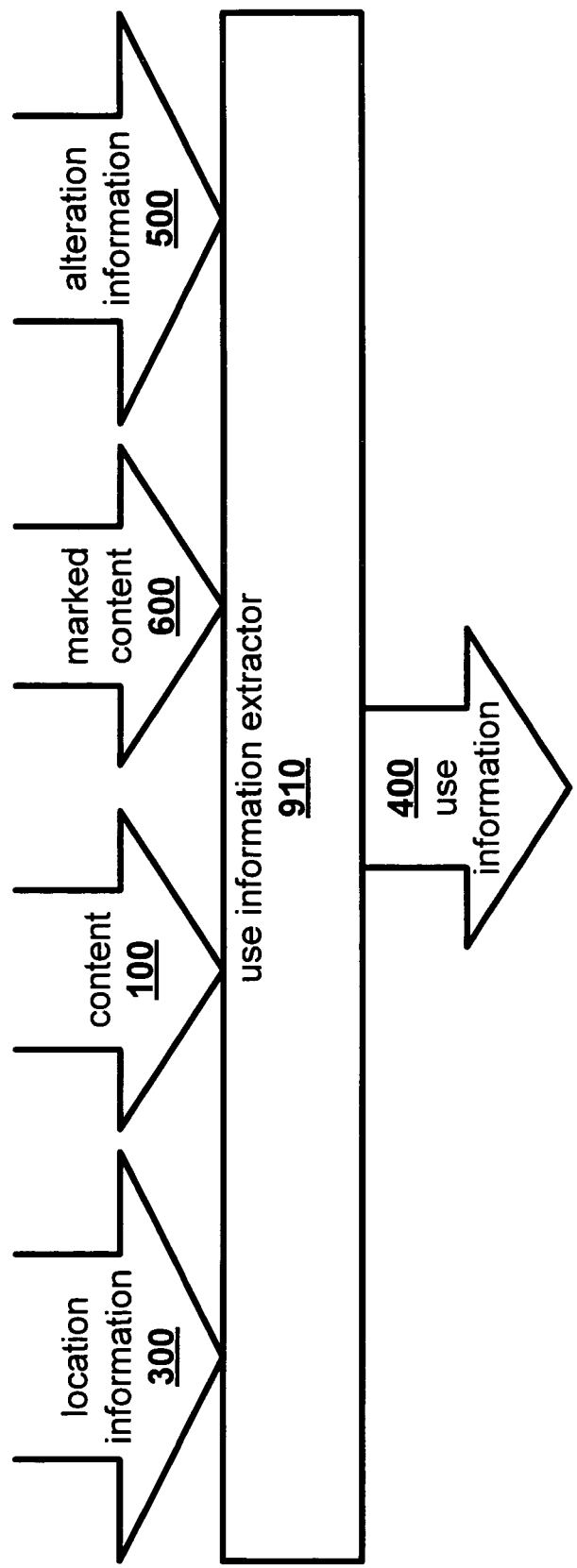
FIG. 4 is a block diagram of a use information extractor as per an aspect of an embodiment of the present invention.

A use information extractor 910 is shown in FIG. 4. The use information extractor 910 is preferably capable of extracting use information 400 from the marked content 600 by comparing the content 100 with the marked content 600. While performing this comparison, it may be important for the use information extractor 910 to know the location information 300 and alteration information 500 used in marking the content. However, it may be possible in some embodiments, that the use information 400 may be extracted with only a subset of the location information 300, alteration information 500, and content 100 available in analyzing the marked content 600. This elements needed will depend upon the technique used to embed the information. For example, if the system depends upon a predetermined algorithm which defines the alteration information 500 and location information 300, these pieces of information may become implicit and need to be explicitly provided to the use information extractor 910. Alternately, the system could be implemented such that the location information 300, alteration information 500, and content 100 be available in analyzing the marked content 600.

Figure 5:
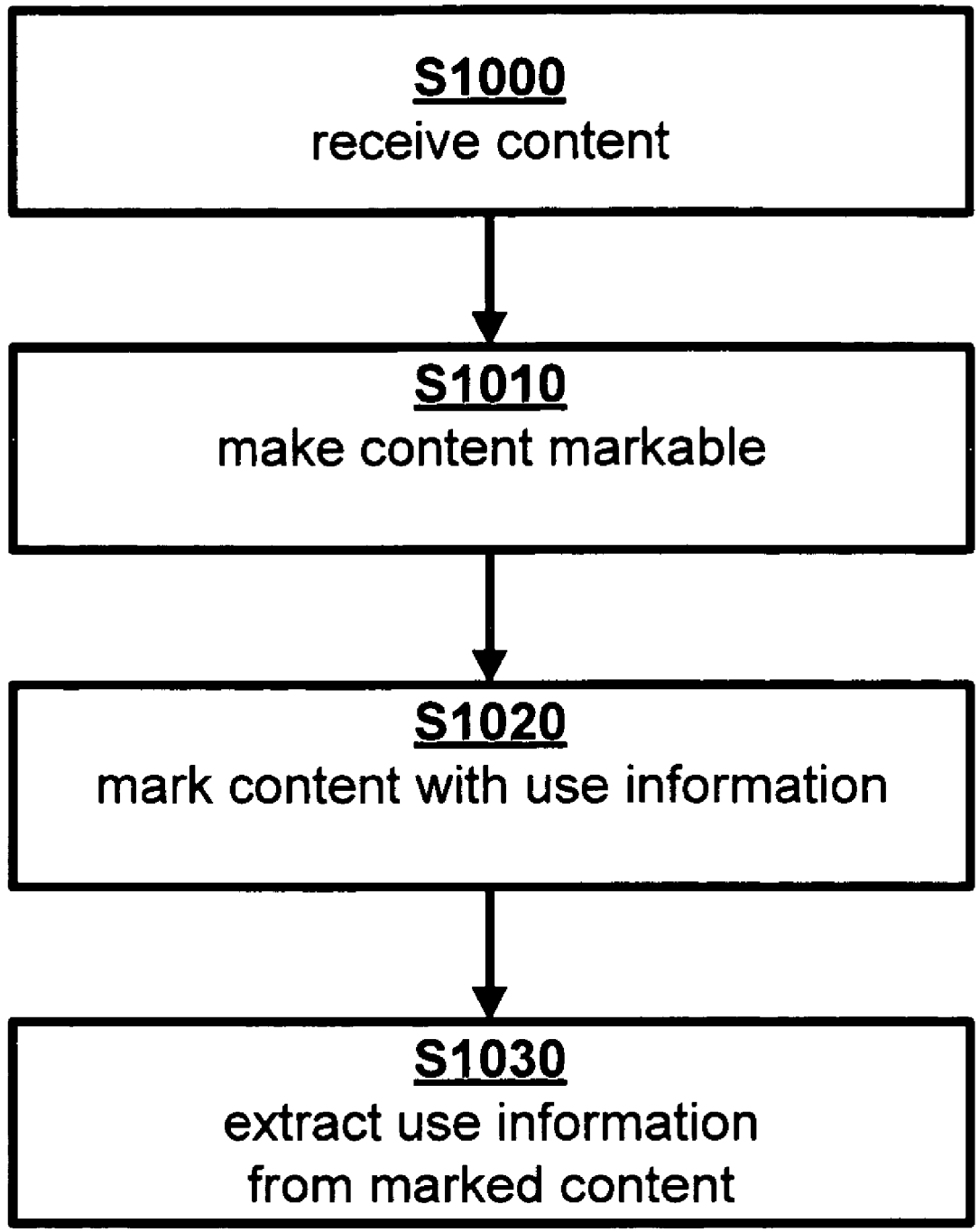
FIG. 5 is a flow diagram of a content use tracker as per an aspect of an embodiment of the present invention.

The present invention may also be described in terms of the steps to process content 100 to enable tracing of at least one of a multitude of subsequent uses of the content by at least one user. Referring to FIG. 5, we see a flow diagram of a content use tracker as per an aspect of an embodiment of the present invention. Content 100 may be received by the system at step S1000. Next, the content 100 may be made markable at step S1010. The markable content 200 may then be marked at step S1020 by subsequent users. Preferably, marks include use information 400. Some locations in markable content 200 may be marked once or reused. Finally, use information 400 or other data carried in the marks may be extracted from the marked content 600 at step S1030. Each of these steps will now be looked at in more detail.

Figure 6:
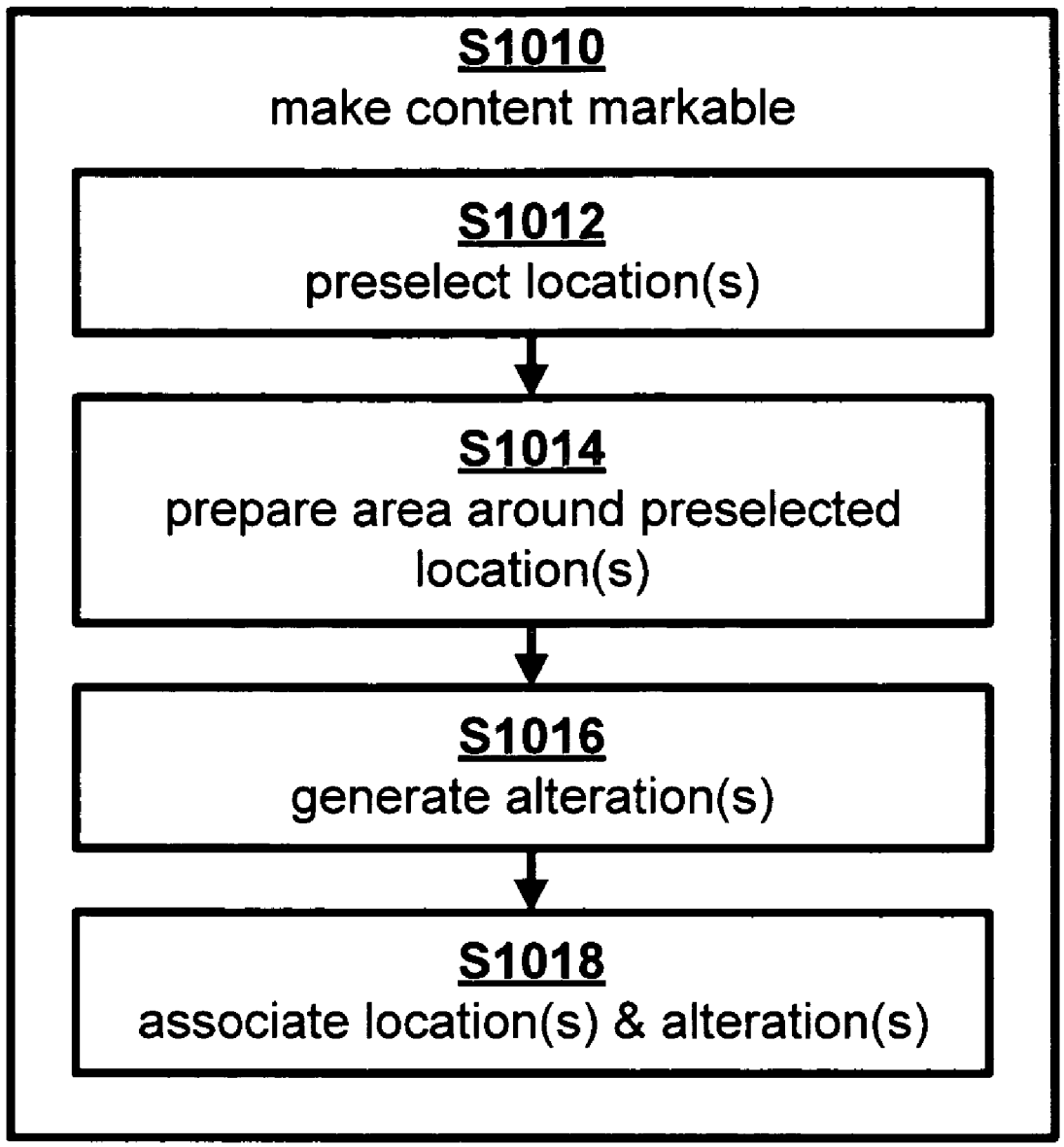
FIG. 6 is a flow diagram showing how content may be made markable as per an aspect of an embodiment of the present invention.

FIG. 6 is a flow diagram which expands upon step S1010 to show how content 100 may be made markable as per an aspect of an embodiment of the present invention. At step S1012, location(s) 300 in the content 100 capable of storing use information 400 may be preselected. Preselection may be based upon criterion such as described in the '477 patent, for image visibility, or image invisibility. In some embodiments of the present invention, the area around the preselected location(s) 300 may then be specially prepared for possible alteration(s) 500 at step S1014. At step S1016, alterations 500 may be generated as previously described in both this disclosure and within the literature of the art. These locations and alteration(s) may then be associated at step S1018. As described alteration(s) may include alteration information 500. Alteration information 500 may include both alterations per se and information about how to perform alterations. Similarly, location information 300 may be a place in the content where alterations may be implemented.

Figure 7:
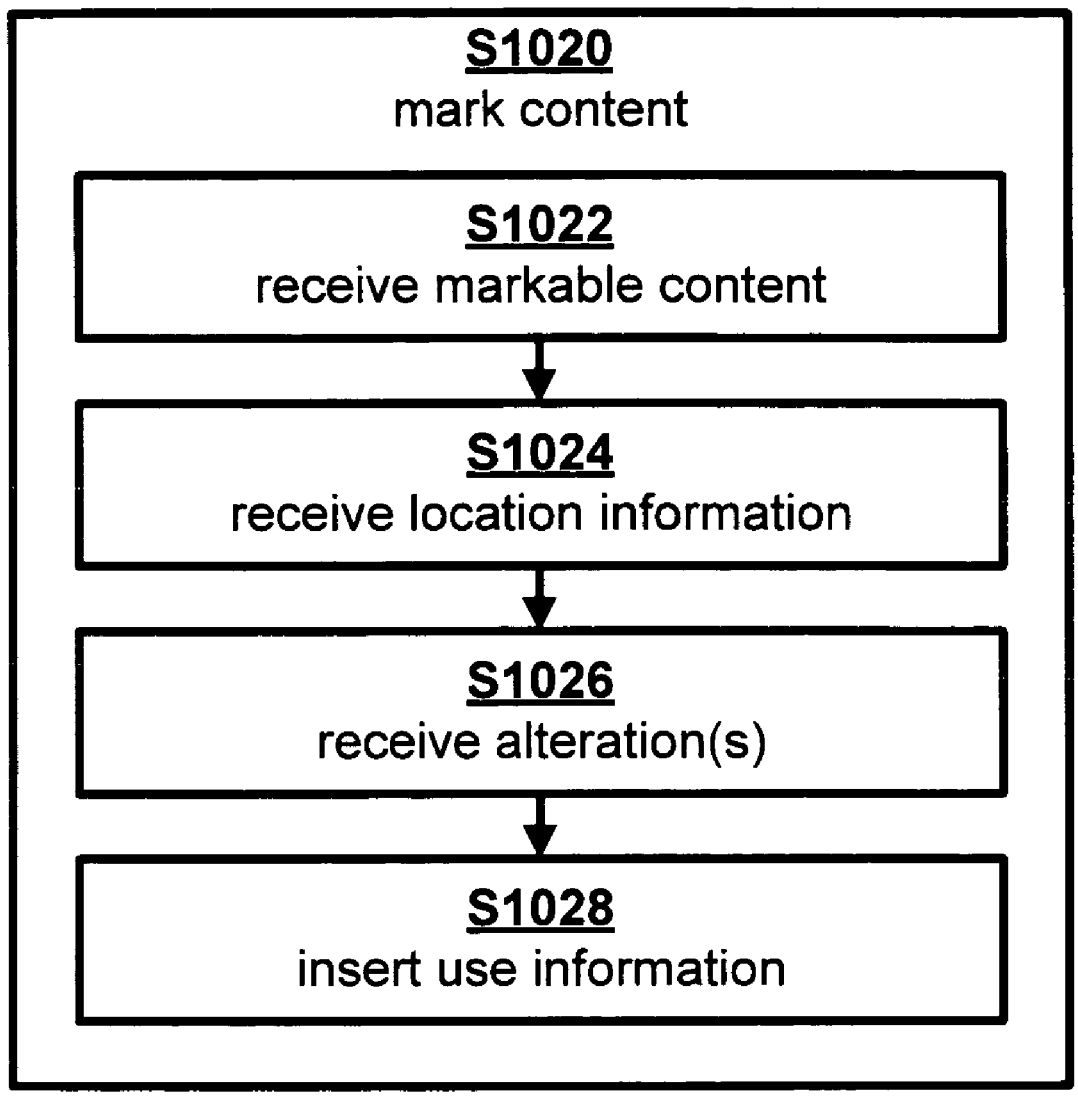
FIG. 7 is a flow diagram showing how content may be marked as per an aspect of an embodiment of the present invention.

FIG. 7 is a flow diagram which expands upon step S1020 showing how content 100 may be marked as per an aspect of an embodiment of the present invention. At step S1022, markable content 200 may be received by a content marker 840. Similarly, at steps S1024, location information 300 may be received by a content marker 840. And, at step S1026, alteration information 500 may be received by a content marker 840. Receipt of this alteration information 500 does not need to be received in any particular order. Using this information, use information 400 may be inserted into the markable content 200 by selectively modifying at least one location 300 using at least one alteration 500.

The marked content 600 may be reproduced or recorded on a recording medium. The recording medium may be any recording medium including but not limited to magnetic tape, optical disc, and magnetic disc. The use information 400 may then be extracted from marked content 600 contained on the recording medium or on any subsequent copy of the data on the recording medium.

Figure 8:
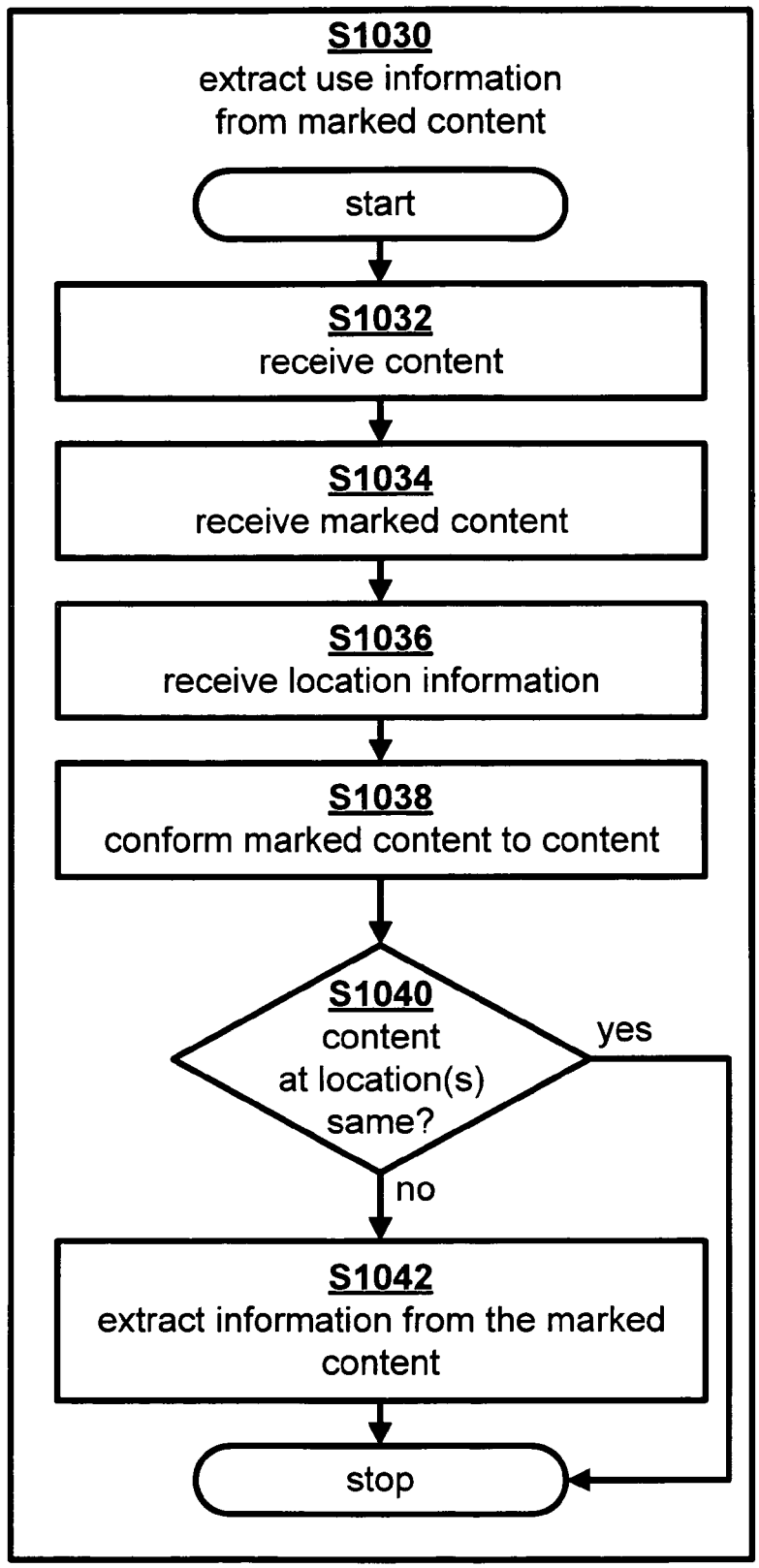
FIG. 8 is a flow diagram showing how use information may be extracted from marked content as per an aspect of an embodiment of the present invention.

FIG. 8 is a flow diagram which expands step S1030 and shows how use information 400 may be extracted from marked content 600 as per an aspect of an embodiment of the present invention. At steps S1032, S1034 and S1036, content 100, marked content 600 and location information 300 are received. There is no particular order in which these steps must be performed. The marked content 600 may then be conformed to the content 100 at step S1038. Conforming the marked content 600 may include processing the marked content 600 so that it is in a similar state as the content 100. Processing steps may include one or more of enlarging, reducing, adjusting contrast, adjusting brightness, equalizing frequency components, cropping, rotating and adjusting color variations.

Content at each location 300 may be analyzed and/or compared at step S1040. If the content is the same, then there is no use information 400 to extract from that location. If the content is not the same, then the use information 400 may be extracted from the marked content 600 at step S1042. The analyzing/comparison step may include using an alteration list which provides information about alterations. Similar lists may also be used which provide information about locations, etc.

The method used to extract the use information 400 depends upon the method used to inject the use information 400. For example, if the use information 400 was inserted using an algorithm which attenuated the signal by 10% if the data was a '1' and amplified the signal if the data was a '0', then a complimentary algorithm may be used which can detect and decode these alterations. Some methods may define that a '0' or a '1' is an unchanged location. Also, the bit value may be determined through more complex analysis of content by weighting the possibility of each location to contain a value and then processing this weighted stream with a correlation device.

The present invention envisions that content retrieval devices (such as DVD or HD-DVD optical drives) may incorporate marking devices 840. These marking devices 840 may be embedded within a regular DVD player 1100 or as a component disc drive 1200 capable of working in a system. The main similarity in these two embodiments is that tracing information may be inserted into the content within the bounds of either the dedicated DVD player 1100 or the component disc drive 1200.

Figure 9:
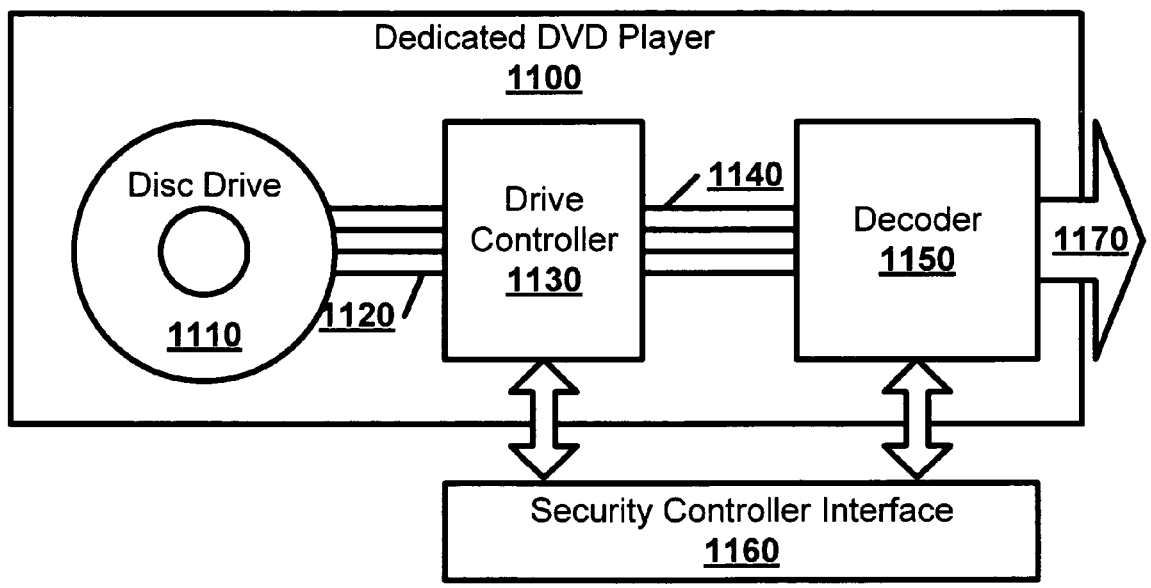
FIG. 9 is a block diagram of a dedicated DVD player capable of inserting tracing information into content as the content is retrieved as per an aspect of an embodiment of the present invention.

FIG. 9 is a block diagram of a dedicated DVD player 1100 capable of inserting tracing information into content as the content is retrieved as per an aspect of an embodiment of the present invention. In this embodiment, a disc drive 1110 talks to a drive controller chip 1130 over a disc drive interface 1120 (such as a SCSI or IDE disk drive interface). The drive controller 1130 performs functions such as servo control, and error correction. The drive controller 1130 communicates to a decoder 1150 over a drive controller interface 1140. The decoder 1150 may also perform other DVD content functions including decryption functions, interactive content control functions, etc. In modern DVD player implementations today, it is not uncommon for drive controller 1130 and decoder 1150 functions to exist in a single chip without the need of an external drive controller interface 1140. It may be useful to have the drive controller 1130 and/or the decoder 1150 be capable of utilizing security mechanisms to assist with key management, data insertion information, tracing information control and general access control. Output from the player will normally exit the player with a standard user audio/video interface at 1170. Audio/video interface 1170 may be analog or digital and be capable of delivering the output content in various forms such as encoded or encrypted. Audio/video interface 1170 may utilize standardized digital interfaces such as the IEEE 1394-1995 Standard for a High Performance Serial Bus or one of the IEEE 802 Ethernet standards. The output may be delivered over this interface to downstream networks such as a home network.

Figure 10:
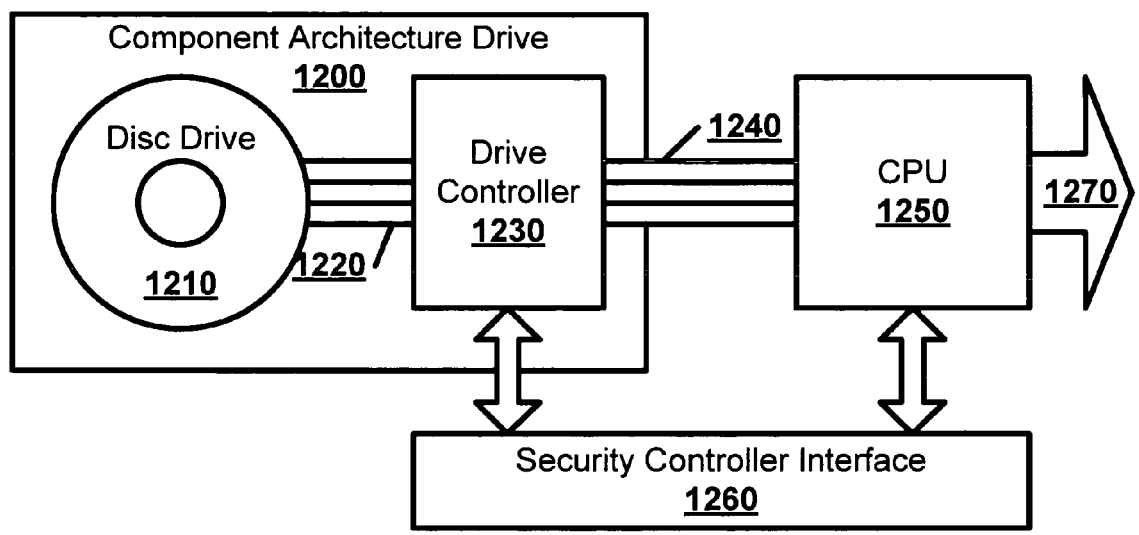
FIG. 10 is a block diagram of a component disc drive capable of inserting tracing information into content as the content is retrieved as per an aspect of an embodiment of the present invention.

FIG. 10 is a block diagram of a component disc drive 1200 capable of inserting tracing information into content as the content is retrieved from media as per an aspect of an embodiment of the present invention. A main objective of this embodiment is to mark content as it is retrieved from the media by the component disc drive 1200.

In this embodiment, the component disc drive 1200 has an embedded controller 1230 built into the drive. This embedded controller performs the "low level" disc controller function while enabling general purpose data input and output. The drive 1200 may then be used in general purpose PC's or even in stand-alone players such as a DVD player. With the exception that this embodiment is capable of inserting tracing information into content, many stand alone DVD players use this kind of architecture. The drive 1200 uses an interface 1240 (such as an ATA 100 interface) to talk to the rest of the system. The system will normally be configured with additional hardware that includes or utilizes a more generalized CPU or control electronics 1250. The controller 1230 may do the servo, error correction, and interface logic (ATA interface logic). Typically, the drive interface 1240 is an ATA interface.

These units 1200 and 1250 when acting as a DVD player are normally configured to be capable of performing rudimentary security functions between the two halves (1200 & 1250) such as setting up sessions and authenticating the drive. To assist in security, it may be useful to have the drive controller 1230 and/or the decoder 1250 capable of supporting security functions either internally or through a security controller interface. For example, when playing a DVD, the drive may support the Content Scrambling System (CSS), a form of copy encryption that that prevents reading files directly from a disc. Occasional sectors may be scrambled in such a way that the data can not be used to re-create a valid signal. In addition, other proprietary disc level security systems may be supported such as described in European Patent No. EPO 954774 to Christopher et al., entitled "Method and apparatus for encrypting and decrypting data arranged in a data sector." Additionally, the system could support link encryption, using a Data Encryption Standard (DES) such as standard ANSI X3.106. (See Standard ANSI X3.106, "American National Standard for Information Systems-Data Link Encryption," American National Standards Institute, 1983). It is envisioned that the present invention may be practiced with new and future security measures. These measures may be implemented in hardware, software, or some combination. Further, these measures may be implemented in combination with PC's, other hardware devices, or standalone.

As stated earlier, the present invention adds to the prior art the ability to securely insert marks into the content before the content leaves a drive (or player). It is envisioned that these drives would include both current state of the art (such as DVD) and next generation media retrieval devices (such as HD-DVD).

The marks inserted in this secure disc retrieval environment will preferably include playback information such as: a drive identifier; date/time of retrieval of data from the disc; and if applicable in a special player or within a PC, a user or account identifier.

However, it is not a given that the content will actually be played back. It is possible in next generation systems that the content would come off a storage media and be stored on a server or portable device either in a home or on an accessible network. Therefore, it may be useful to extend the mark information 400 with additional system information such as a system identifier, a serial number of a drive, a serial number of a decoder or a CPU, a 1394 identifier, a timestamp, or some combination. Basically, any piece of information that can help identify the person (such as a user authorization or identifier), equipment (player), time or place of content retrieval from the disc could be useful as marking information 400.

As just described, it will be useful to use the current invention to insert the system information at the time of retrieval of the data. Additionally, if the content is stored, or further transmitted, additional content markers 840 may be utilized to add or include further running mark insertion data in the released content. This incremental (multi-stage) running mark information 400 may then be useful in tracking the movement of the content.

Therefore, content 100 may be prepared to accept running mark information 400. This information 400 may added to the content 100 before it is released, or utilizing a marking drive (1100 or 1200), the content 100 may be marked as it leaves the drive (1100 or 1200) with information 400 such as a drive identifier and a PC identifier identifying to which PC the data has been released.

The present invention may also be used to mark content streams as the content 100 is streamed to remote locations, whether the streaming occurs locally (i.e. in-house using and intranet) or not (i.e. over a larger network such as the Internet).

All of these systems may utilize separate security systems to help enforce that all of the proper making occurs. For example, a security system could monitor marked content 600 to ensure that the content 100 was marked properly and shut down or report offending systems or system components. The security system could be used to encrypt the markable content 200 such that the location information 300 and alteration information 500 may only be recovered and used by authorized devices.

In the case of the present invention embedded in a DVD player or a dedicated playback device (the equivalent of today's DVD player), a user will merely insert the disc into the player 1100 and the markable content 200 will be marked as the markable content 200 is played. In that environment, the markable content 200 may have running marks data 400 added to the discs at authoring time when the disc is prepared for distribution. The markable content 200 may normally be encrypted, therefore, the player 1100 may take the step of decrypting the markable content 200. Next use information 400 may be inserted into the running marks at locations pointed to by location information 300. After the use information 400 is inserted into the markable content 200, the marked content 600 may depending on the output implemented: be decompressed and output in a presentable form, or output over an interface (such as 1394) prior to decompression.

In a component environment, a drive 1200 may be used as a content marker 840. In this case, the markable content 200 may already be marked when it leaves the drive 1200 over a drive interface 1240 to be processed by other equipment (such as 1250). The process for utilizing this system may start by reading data from a disc. This data is preferably already encrypted. The markable content 200/600 may then be decrypted and tracing information 400 added to the content 200/600 using running marks. The marked content 200/600 may then be re-encrypted and released as data across an interface 1240 to other components (such as 1250). If the content 200/600 is ever played on non-compliant equipment, the content 200/600 may now contain marks with use information 400 made by previous equipment 840.

In accordance with the present invention, two possible strategies for creating running marks will now be described. The first relatively straightforward strategy consists of simply allocating disjoint subsets of message holes to each running mark. For example, if a maximum of n running marks are to be inserted, every nth message hole could be allocated (reserved) for a given running mark (ie, the kth running mark, 0<=k<n, would be assigned to message holes with k=MH mod n). This strategy allows easy and precise separation of running marks. It completely avoids certain issues of waveform detection that are associated with "composite" or "layered" running marks. Basically, when all n running marks have been inserted, decoding reduces to n simple decodings each with sample size reduced by a factor of n. If decoding is performed when fewer than n running marks have been introduced, some mechanism must be available to detect which are present and which are missing (eg, an all zero message would likely suffice to represent a "missing" running mark).

An alternate strategy involves encoding all applicable (at a given point in time) running marks into a composite running mark and recording it using the complete set of message holes. Among the ways that this might be implemented are.
  a) the "bits" of the composite running mark are computed as the bitwise logical OR of the bits for each individual ECC encoded running mark;
  b) the "trits" (ie, 3 state objects each capable of representing just over a "bit and a half") of the composite running mark are computed to indicate which of three possibilities is the case (all bits in the corresponding position of each individual ECC encoded running mark are 0-bits, all are 1-bits or there is a mixture); and
  c) a small integer associated with each bit position of the composite running mark is computed as the number of 1-bits in the corresponding position of each individual ECC encoded running mark.

Note that these potential implementations (a through c, above) are intended to be representative of approaches that might be taken, not an exhaustive list of possibilities. The intention is to illustrate some characteristics of these approaches through limited empirical investigation with principal focus on ECC related issues.

Specifically, one way to generate individual running marked messages (each represented as a complete set of distance pairs) is to:
  generate a "random" 64 bit message;
  ECC encode the message yielding an encoded message of 139,264 (136K) bits using a "randomly" selected (or duplicated) CDMA waveform;
  modify (0->1 or 1->0) a specified number of bits (exactly 0, 16K, 32K or 48K distinct bits corresponding to 0%, 12%, 24% and 35% of a full encoded message, respectively); and
  generate "exact" distance pairs to represent extracted estimates of distance from/to carrier 0 and distance from/to carrier 1.

One way to generate composite running marked messages is to:
  generate the appropriate number of individual running marked messages controlling waveform selection; and
  build each composite message by computing aggregated distance pairs from individual message distance pairs using an appropriate scheme.

These schemes may be tested by:
  generating composite messages (typically 1000 per category) combining 1 through 5 individual ECC encoded messages;
  extracting samples of sizes 136K bits, 68K bits, 34K bits or 17K bits (1, 1\2 ¼ or ⅛ of a complete ECC encoded message, respectively); and
  attempting to decode each individual message.

A description of some exemplary generation and decoding methods will now be mentioned.

Decoding may be performed using an ECC decoder with no waveform duplication. Only using capabilities of ECC encoding/decoding routines may avoid waveform detection and duplication issues by assigning unique waveforms to each individual ECC encoded message and by forcing use of the correct waveform during each decoding.

Decoding may be performed using an ECC decoder with waveform duplication. Waveform detection issues may be avoided by forcing use of the correct waveform during each decoding by only using capabilities of ECC encoding/decoding routines where waveform duplication is forced.

Waveform detection may be performed using an ECC decoder with no waveform duplication (Single Mark). In these cases, the waveform used for encoding should be used for decoding because attempts to decode with any other waveform will almost always fail. A facility to allow the use of a sample "set of bits" with cardinality from 1 (same as original) through 127 (just under half of the bits used in a single CDMA decoding step) or to force a given waveform may be used.

Waveform Detection using an ECC Decoder with no waveform duplication. Waveforms such as those used for CDMA encodings may be used. Of course, the waveform used for encoding should be used for decoding because attempts to decode with other waveforms may fail.

Waveform Detection using an ECC Decoder with waveform duplication. In this case, all individual running marks associated with any given composite running mark are generally known to have been ECC encoded with some duplication of waveforms. Waveform duplication may be forced Waveform detection sample size may be fixed at 1.

Mixed Strategy Encodings. The strategies considered above may not be incompatible and a mixture of them might well be appropriate in certain contexts. One could perhaps record multiple non-volatile messages using one strategy and volatile messages using another strategy. For example, one set of message holes might be used to record non-volatile "chain of custody" and "player identification" messages as composite messages which may be updated at different points in time. A second (preallocated, distinct and likely interleaved) set of message holes could be used for recording "end user" playback messages. Among the advantages that might accrue are:
  Early introduction of partial "chain of custody" and player identification into the composite message track, could leave the appropriate information encoded in a relatively low visibility (to 1-player collusion attack) manner while covering the content pretty well (assuming appropriate interleaving of tracks);
  Additional non-volatile "chain of custody" information could subsequently be added to the composite message without altering its visibility or requiring an additional track; and
  During end user playback, volatile information such as time stamps could be recorded separately in the second track without altering the visibility of other non-volatile data recorded in the track containing the composite marks.

Possible Extensions of CDMA Waveform Usage. Current Waveform usage based on a 512 row by 128 column table of bits (recorded as 512×16 bytes) may be used to provide 128 distinct waveform selections. ECC encoder waveform selections may be made by providing the displacement to a starting column (such as based on a random number which is internally reduced modulo 128). The waveform selection used may be taken to be 512 rows by 272 columns where each row begins at the selected column and the corresponding row of the waveform table and successive bits are selected from successive columns of the table (with wrap). That is, if column k is selected, each row is constructed solely from bits in the corresponding row of the table using bits k, (k+1) mod 128, . . . (k+271) mod 128. An important feature of the table is that every column contains an equal number (256) of 0-bits and 1-bits. The selection process may preserve this feature.

A possible extension is to augment the current selection process by adding an increment selector i to the selection process. Selection of bits that comprise a row would not necessarily be selected from consecutive bit positions but they should select all 128 bit positions before repeating.

Another important characteristic of the waveform generation scheme used is that the number of columns in the table should be a power of 2. Because the number of columns is a power of 2 all smaller odd positive integers are relatively prime to it and hence any of them can be used as an increment modulo 128 with assurance that every bit position will be used before the selection sequence repeats. So, for example, using the 8 odd increments 1, 3, 5, . . . 15 would allow for an 8 fold increase in waveform selections. One such scheme would take the bits in a row from positions (k+2*i+1) mod 128, where k is the starting position selector $0 \leq k \leq 127$ and i is the increment selector $0 \leq i \leq 7$.

One use of extended waveform generation is to allow random waveform selection to produce a wider range of waveforms thus reducing the probability of two independent selections yielding the same waveform selection.

Another possible use is to ECC encode individual running marks that form a composite running mark from separate groups of extended waveform selections (eg, the nth running mark is encoded using extended waveform selection from group i-1.

Possible Extensions of MVLP Usage. Current MVLP (Multiple Variable Length Permutations) usage is based on an 8 row by 64 column table of bytes. This provides space for 8 permutations capable of permuting a maximum of 64 bits each. A companion 8 entry array provides lengths for each of the permutations. Bit level permutations may be applied to the 136 Kb result of the previous encoding steps (RS, CC and CDMA) by permuting the initial bits using the 1st permutation, the next bits using the 2nd permutation, . . . the next bits using the 8th permutation, the next bits reusing the 1st permutation, etc., wrapping as many times as are required to permute all bits. Of course, the number of bits permuted at each step matches the length of the permutation being applied with the possible exception of the last step where the length of the permutation may exceed the number of bits remaining to be processed. In this case the permutation may be shortened to match the number of bits to be processed.

A possible extension is to allow a starting permutation to be selected (in a manner analogous to CDMA waveform selection occurs). Thus 8 distinct MVLP mappings could be used. So when the selection k is specified ($0 \leq k \leq 7$), the sequence would begin with permutation k (0-origin indexing) and proceed as above (ie, step i would use permutation (k+i) mod 8 (again, using 0-organ indexing). One use of this is to ECC encode individual running marks that form a composite running mark using different MVLP selections.

The foregoing descriptions of the preferred embodiments of the present invention have been presented for purposes of illustration and description. They are not intended to be exhaustive or to limit the invention to the precise forms disclosed, and obviously many modifications and variations are possible in light of the above teaching. The illustrated embodiments were chosen and described in order to best explain the principles of the invention and its practical application to thereby enable others skilled in the art to best utilize the invention in various embodiments and with various modifications as are suited to the particular use contemplated. For example, one skilled in the art will recognize that the present invention may be used for tracing usage of content other than just copyrighted content. In addition, although embodiments which utilize DVD or future optical disc formats such HD-DVD format, Blu-ray Disc format, and the Enhanced Versatile Disc (EVD) format were described, it is envisioned that the present invention could be practiced using other types of media storage such as solid state discs.

What is claimed is:

1. A method for processing content to enable tracing of at least one of a multitude of subsequent uses of said content by at least one user comprising:
   (a) making markable content by:
      (i) preselecting at least one location in said content capable of storing use information;
      (ii) generating at least one alteration; and
   (b) creating marked content by iteratively:
      (i) providing a current user with said markable content; said current user being at least one of said at least one user;
      (ii) providing said current user with at least one of said at least one location;
      (iii) providing said current user with at least one of said at least one alteration; and
      (iv) inserting said use information into said markable content by selectively modifying at least one of said at least one location using at least one of said at least one alteration; and
   wherein said markable content is marked content.

2. The method as described in claim 1, wherein said current user obtains at least one of said at least one location from a prior user.

3. The method as described in claim 1, further including the step of preconditioning at least one of said at least one location.

4. The method as described in claim 1, wherein said at least one of said at least one location is non-regularly occurring.

5. The method as described in claim 1, further including the step of associating at least one of said at least one alteration with at least one of said at least one location.

6. The method as described in claim 1, further including the step of scrambling said use information prior to inserting said use information into said markable content.

7. The method as described in claim 1, including the step of encrypting said use information prior to inserting said use information into said markable content.

8. The method as described in claim 1, further including the step of comparing said content with said marked content to determine said use information.

* * * * *